Jan. 19, 1943.    R. L. SMITH    2,308,786
ALKYLATION
Filed March 24, 1941
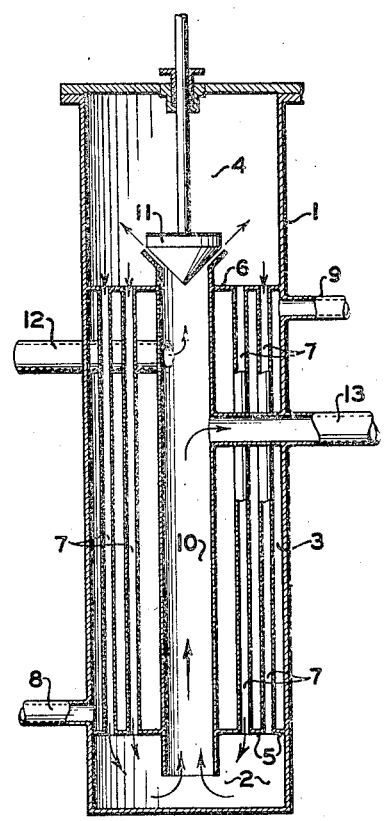
INVENTOR
ROBERT L. SMITH
BY *Lee J. Cary*
ATTORNEY Patented Jan. 19, 1943

2,308,786

UNITED STATES PATENT OFFICE 2,308,786

ALKYLATION

Robert L. Smith, Chicago, Ill., assignor to Universal Oil Products Company, Chicago, Ill., a corporation of Delaware Application March 24, 1941, Serial No. 384,854

9 Claims. (Cl. 196—10)

This invention relates to improvements in a process and apparatus for the alkylation of hydrocarbons and more specifically to a method and means for reacting isoparaffin hydrocarbons with olefin hydrocarbons to produce predominantly branch chain hydrocarbons which are substantially saturated. The invention, however, may also be employed for the alkylation of hydrocarbons other than those mentioned above, such as, for example, aromatic hydrocarbons with aliphatic hydrocarbons.

Many forms of apparatus have been used or are being used in alkylation processes and of these one in particular has shown very definite advantages over the other forms. The particular reactor referred to is one of the turbo mixer type in which provisions are made for establishing a definite circulation of the hydrocarbon reactants and catalyst within the contactor while at the same time effecting intimate mixing and cooling of the hydrocarbon reactants and catalyst. With contactors employing high internal recirculation rates and intimate mixing, it has been found that the ratio of reactants such as for example isobutane to butenes in the charge to the contactor may be less than the ratios employed with low recirculation rates and poor mixing. In addition, when relatively high internal rates of recirculation are used with intimate mixing of the hydrocarbon reactants and catalyst, the residence time of such materials within the contactor required to effect the desired reaction is reduced, and, in such cases, smaller contact vessels than those previously employed have found commercial application.

In the operation of contactors of the above mentioned type, however, it is general practice to introduce the catalyst to such contactor at a point some distance removed from the mixing or impeller device, to add the olefin just before the mixing device, and to remove products of reaction immediately after the mixing device. It is also general practice in contactors of the type above mentioned for the flow of the recirculating mixture to be vertically up when the linear velocity of flow is greatest and down when the flow is least. In such systems, therefore, it is not unusual to obtain some settling and separation of the more dense catalyst phase from the mixture where the time is long, so that the catalyst concentration is least where it should be greatest, and to remove products of reaction as an emulsion which may be avoided to some extent by improvements, which hereinafter will be discussed more fully.

In order to obviate many of the disadvantages inherent in an apparatus at present employed, I propose to withdraw products of reaction at a point farther removed from the mixing device whereby to permit a settling time within the contactor itself and to introduce the charge of hydrocarbon reactants and catalyst immediately before the mixing device but beyond the point of withdrawal of the products of reaction thereby permitting a maximum time of reaction for all the olefin, maximum concentration of catalyst in the section of the reactor where reaction time is greatest, and partial preliminary separation of the catalyst and hydrocarbon phases just before their withdrawal to a final separator.

In one embodiment the invention involves a method of contacting fluids which comprises impelling a stream of said fluids upwardly in a confined stream from a lower to a higher zone, returning another confined stream or streams of said fluids downwardly from the higher to the lower zone, maintaining a relatively low linear velocity in the first named stream in order that heavy components thereof will gravitate and concentrate in said lower zone, introducing the fluids to be contacted into the first named stream at a point adjacent to the upper zone, and removing contacted fluids from the first named stream at a lower point therein.

The accompanying diagrammatic drawing illustrates in conventional side elevation a contactor embodying the essential features of the invention.

The contactor consists of an outer shell 1 divided into three zones, a lower zone 2, an intermediate zone 3, and an upper zone 4. Intermediate zone 3 is formed by and lies between tube sheets 5 and 6 which support spaced conduits 7, the latter establishing communication between the lower and upper zones 2 and 4, respectively. Intermediate zone 3 is provided with a conduit 8 through which a cooling or refrigerating fluid is introduced into zone 3 passing in indirect heat exchange relationship with the conduits extending therethrough in order to cool reactants passing through the conduits in the manner to be described whereby to maintain such reactants at the desired alkylation temperature. Zone 3, in addition, is provided with a conduit 9 through which the cooling or refrigerating fluid is withdrawn to a cooling or compressing means for further use.

Communication between lower and upper zones 2 and 4 is also established by means of central conduit 10 which preferably has a greater cross-sectional area than the total cross-sectional area of the spaced conduits 7. Preferably also, central conduit 10 projects into lower zone 2 beyond its point of contact with tube sheet 5 in order to avoid setting up stagnant pools of fluids in such lower zone. The upper portion of central conduit 10 is flared, the flared portion extending into upper zone 1 above the point of contact of central conduit 10 with tube sheet 6.

A rotating member 11 driven by any well known means, not illustrated, is disposed adjacent the flared portion of central conduit 10 in upper zone 1. Preferably also, rotating member 11 is fluted or equipped with vanes so that it serves as a lifting and mixing device pulling fluids up through central conduit 10 and discharging the same into upper zone 4, said fluids being returned to lower zone 2 by way of spaced conduits 7.

In accordance with the objects of this invention, in order to obtain best results, fluid reactants and catalyst are introduced to central conduit 10 at a point adjacent the upper zone and just below rotating member 11 by way of conduit 12. In order that the reacting fluids may pass through the system at least once, products of reaction are withdrawn from central conduit 10 at a point therein just below that at which the reacting fluids are introduced, as by way of conduit 13.

In the process of this invention, the hydrocarbon reactants comprising, for example, a mixture of iso-butane and butenes in a ratio preferably in excess of 2:1 together with sulfuric acid in the preferred ratio of about 0.5 to 2 parts of sulfuric acid to 1 part of hydrocarbon is introduced through conduit 12 to central conduit 10. The flow of hydrocarbon reactants in this conduit is upward, the upward movement being produced as the result of lifting action of rotating member 11. Fluid reactants in central conduit 10 are picked up by rotating member 11, intimately mixed, and discharged into upper zone 1. The mixture in upper zone 1 flows at a relatively rapid rate through spaced conduits 7 into lower zone 2 and in its passage through spaced conduits 7 it is cooled by means of a cooling or refrigerating fluid such as propane or ammonia, introduced to intermediate zone 3 by way of conduit 8, and withdrawn by way of conduit 9. The reacting fluids collecting in lower zone 2 flow upwardly through central conduit 10 at a lower rate than the rate of flow through spaced conduits 7 whereby at least a slight degree of settling and separation of the hydrocarbon reactants and acid is effected. A portion of the stream of fluid reactants in central conduit 10 is withdrawn therefrom as a product by way of conduit 13. The residual portion of the stream of fluid reactants in conduit 10 is commingled with the fresh feed from conduit 13, the flow thereafter being substantially as described.

The reaction products removed by way of conduit 13 may be supplied to a separator wherein the hydrocarbons are substantially separated from the acid phase and at least a portion of the used acid returned to the contactor along with another portion of fresh acid while the residual portion is recovered. The hydrocarbons separated in the manner described may be treated to separate or neutralize entrained acid, the resulting treated hydrocarbons fractionated to separate iso-butane from the residual products, the former returned to the alkylation zone or contactor, and the residual hydrocarbons recovered as products of the process.

I claim as my invention:

1. An alkylation process which comprises maintaining hydrocarbon reactants for the alkylation and alkylating catalyst under alkylating conditions in a reactor having an upper zone and a lower zone, impelling a stream of said reactants and catalyst upwardly from the lower zone to the upper zone under a sufficiently low linear velocity to permit gravitation of relatively heavy components of said stream to the lower zone, whereby to maintain a higher concentration of said heavy components in the lower zone than in the upper zone, passing another stream of reactants and catalyst downwardly from the upper zone to the lower zone to maintain a cyclic circulation of reactants and catalyst between said zones, introducing hydrocarbon reactants to the reactor by adding the same to the first-mentioned stream at a point adjacent the upper zone and removing reaction products from this stream at a lower point therein and discharging the same from the reactor.

2. An alkylation process which comprises maintaining hydrocarbon reactants for the alkylation and alkylating catalyst under alkylating conditions in a reactor having an upper zone and a lower zone, impelling a stream of said reactants and catalyst upwardly from the lower zone to the upper zone under a sufficiently low linear velocity to permit gravitation of relatively heavy components of said stream to the lower zone, whereby to maintain a higher concentration of said heavy components in the lower zone than in the upper zone, passing another stream of reactants and catalyst downwardly from the upper zone to the lower zone to maintain a cyclic circulation of reactants and catalyst between said zones, mechanically mixing the reactants and catalyst in said upper zone, introducing fresh hydrocarbon reactants and catalyst to the reactor by adding the same to the first-mentioned stream in advance of the point of mixing and removing reaction products from this stream at a point farther remote from the point of mixing and discharging the same from the reactor.

3. The process as defined in claim 1 further characterized in that the first-mentioned stream is of greater cross-sectional area than the second-mentioned stream.

4. The process as defined in claim 2 further characterized in that the first-mentioned stream is of greater cross-sectional area than the second-mentioned stream.

5. The process as defined in claim 1 further characterized in that commingled reactants and catalyst are passed downwardly from the upper zone to the lower zone in a plurality of parallel streams whose total cross-sectional area is less than the cross-sectional area of the upwardly moving stream.

6. The process as defined in claim 2 further characterized in that commingled reactants and catalyst are passed downwardly from the upper zone to the lower zone in a plurality of parallel streams whose total cross-sectional area is less than the cross-sectional area of the upwardly moving stream.

7. An apparatus comprising a chamber, means dividing said chamber into an upper compartment, a lower compartment and an intermediate compartment, tubular connecting means between said upper and lower compartments, an additional tubular member connecting the upper and lower compartments and of greater cross-sectional area than the first-mentioned tubular means, a fixing and impelling device adjacent the juncture of said additional tubular member and the upper compartment and adapted to circulate fluid downwardly through said tubular connecting means and upwardly through said additional member, a fluid inlet connected to said additional member below said mixing and impelling device, and a fluid outlet connected to said additional member below said inlet.

8. The apparatus as defined in claim 7 further characterized in that said additional tubular member projects downwardly into the lower compartment.

9. The apparatus as defined in claim 7 further characterized in that said tubular connecting means comprises a plurality of parallel tubes whose total cross-sectional area is less than the cross-sectional area of said additional tubular member.

ROBERT L. SMITH.